(12) United States Patent
Familiant et al.

(10) Patent No.: US 10,447,072 B2
(45) Date of Patent: Oct. 15, 2019

(54) POWER SYSTEMS AND METHODS USING VOLTAGE WAVEFORM SIGNALING

(71) Applicant: Eaton Intelligent Power Limited, Dublin (IE)

(72) Inventors: Yakov Lvovich Familiant, Brown Deer, WI (US); Michael P. Nowak, Milwaukee, WI (US); Vijay Bhavaraju, Germantown, WI (US); George Arthur Navarro, Raleigh, NC (US)

(73) Assignee: Eaton Intelligent Power Limited (IE)

( * ) Notice: Subject to any disclaimer, the term of this patent is extended or adjusted under 35 U.S.C. 154(b) by 529 days.

(21) Appl. No.: 14/577,486

(22) Filed: Dec. 19, 2014

(65) Prior Publication Data

US 2016/0181861 A1  Jun. 23, 2016

(51) Int. Cl.
| | |
|---|---|
| *H02J 3/14* | (2006.01) |
| *H02J 9/06* | (2006.01) |
| *H02M 7/42* | (2006.01) |
| *G06F 1/26* | (2006.01) |
| *G06F 1/30* | (2006.01) |
| *H02J 7/00* | (2006.01) |

(52) U.S. Cl.
CPC .............. *H02J 9/06* (2013.01); *H02J 9/062* (2013.01); *H02M 7/42* (2013.01); *G06F 1/263* (2013.01); *G06F 1/30* (2013.01); *H02J 3/14* (2013.01); *H02J 7/0047* (2013.01); *H02J 2007/005* (2013.01); *Y02B 70/3291* (2013.01); *Y04S 20/248* (2013.01)

(58) Field of Classification Search
CPC .................................... H02M 7/42; H02J 3/14
USPC ............................................................ 307/38
See application file for complete search history.

(56) References Cited

U.S. PATENT DOCUMENTS

| | | | | |
|---|---|---|---|---|
| 5,852,636 A | * | 12/1998 | Mathieu ................ | H04L 27/122 332/100 |
| 6,549,120 B1 | * | 4/2003 | de Buda .................. | H04B 3/54 370/203 |
| 8,073,573 B2 | * | 12/2011 | Chassin .................... | H02J 3/14 700/286 |
| 8,427,300 B2 | * | 4/2013 | Covaro .................... | H03K 7/08 340/12.32 |
| 8,634,216 B2 | * | 1/2014 | Chapman .......... | H02M 3/33523 363/17 |

(Continued)

OTHER PUBLICATIONS

Notification Concerning Transmittal of International Preliminary Report on Patentability, PCT/US2015/063859; dated Jun. 20, 2017, 8 Pages.

(Continued)

*Primary Examiner* — Adi Amrany
(74) *Attorney, Agent, or Firm* — Stanek Lemon Crouse & Meeks, P.A.

(57) ABSTRACT

Power is provided from a power source and a status of the power source is signaled by controlling a waveform of an AC voltage generated from the power source. The status may include, for example, a capacity of the power source. In some embodiments, a frequency of the AC voltage may be controlled to signal the status. The power source may include, for example, an uninterruptible power supply (UPS), and signaling a status of the power source may include controlling an inverter of the UPS to signal the status. Related systems are also described.

10 Claims, 9 Drawing Sheets

(56) References Cited

U.S. PATENT DOCUMENTS

| | | |
|---|---|---|
| 8,674,823 B1 | 3/2014 | Contario |
| 8,850,237 B2 | 9/2014 | Familiant et al. |
| 2002/0130768 A1* | 9/2002 | Che .......................... H04B 3/54 |
| | | 375/259 |
| 2009/0158056 A1* | 6/2009 | Anderson ................. H02J 3/46 |
| | | 713/300 |
| 2009/0168857 A1* | 7/2009 | Golborne ............ H04L 27/1563 |
| | | 375/223 |
| 2012/0008348 A1* | 1/2012 | Chapman .......... H02M 3/33523 |
| | | 363/37 |
| 2013/0116946 A1 | 5/2013 | Familiant et al. |
| 2013/0320762 A1* | 12/2013 | Trudel ...................... H02J 3/14 |
| | | 307/31 |
| 2014/0001845 A1* | 1/2014 | Bonicatto ................. H02J 3/14 |
| | | 307/11 |
| 2014/0003110 A1 | 1/2014 | Rothblum et al. |
| 2014/0246925 A1* | 9/2014 | Porter ....................... H02J 3/14 |
| | | 307/115 |
| 2016/0190866 A1* | 6/2016 | Pelletier ................... H02J 3/32 |
| | | 307/64 |
| 2017/0033560 A1* | 2/2017 | Berdner ................... H02J 3/14 |

OTHER PUBLICATIONS

McCarthy; *Comparing UPS System Design Configurations*, APC White Paper 75, Schneider Electric; pp. 1-27; www.apcmedia.com/salestools/SADE-5TPL8X_R3_EN.pdf; accessed Oct. 28, 2014.

*High-Availability Power Systems, Part II: Redundancy Options*, Liegert, pp. 1-15, Jul. 2003.

International Search Report and Written Opinion Corresponding to International Application No. PCT/US2015/063859; dated Mar. 24, 2016; 11 Pages.

Communication pursuant to Article 94(3) EPC, European Application No. 15 825 666.9, May 28, 2018, 6 pages.

\* cited by examiner

POWER SYSTEMS AND METHODS USING VOLTAGE WAVEFORM SIGNALING

BACKGROUND

The inventive subject matter relates to electric power systems and methods of operating the same and, more particularly, to power system control apparatus and methods.

Islanded power systems include systems that may be isolated from a utility grid. Such system may include, for example, systems served by uninterruptible power supply (UPS) systems, motor-generator sets, fuel cells, and the like. Typical uninterruptible power supply (UPS) systems are designed to provide uninterrupted power to a protected load by transferring the load from a failed primary source, such as a utility line, to a secondary source, such as a battery, flywheel, fuel cell or the like. UPS systems may also be interfaced to other energy sources, such as motor/generator sets, microturbines, wind-powered generators, and photovoltaic arrays. UPS systems may have a variety of different architectures, including on-line (double conversion), standby and line-interactive. Various different converter (e.g., inverter) architectures may be used in other types of islanded power systems.

Data centers commonly use UPSs in their power distribution systems to ensure a desired level of availability. These power systems may have a variety of different configurations of power sources (e.g., gensets, photovoltaic arrays, batteries and the like), UPSs and interconnecting switchgear. For example, some data center power systems may include a combination of one or more UPSs that provide short-term backup power and one or more diesel and/or natural gas fired generators that provide longer-term backup power. These various power system arrangements may provide various levels of availability. A tiered availability scheme for data centers is defined by the Uptime Institute and described at www.uptimeinstitute.com.

Some systems use redundant UPS arrangements wherein one UPS may be used to back up another UPS. For example, some systems may utilize parallel redundant arrangements in which two or more UPSs (or UPS modules) are connected in parallel to a common bus, with the paralleled system having a capacity sufficiently greater than a maximum projected load to provide redundancy. Other systems may use an isolated redundant arrangement in which one or more primary UPSs serve respective protected loads (e.g., respective server rack rows in a data center) and one or more reserve or "catcher" UPSs is configured to pick up a protected load in the event of a failure (e.g., hardware and/or capacity) of its serving primary UPS. Other types of redundant UPS arrangements are described, for example, in U.S. Pat. No. 8,850,237 to Familiant et al. These UPS arrangements may be further backed up by generators or other power sources.

SUMMARY

Some embodiments of the inventive subject matter provide methods including providing power from a power source and controlling a waveform of an AC voltage generated from the power source to signal a status of the power source. The status may include, for example, a capacity of the power source. In some embodiments, controlling a waveform of an AC voltage generated from the power source to signal the status of the power source comprises signaling the status by controlling a frequency of the AC voltage. In some embodiments, the power source may include an uninterruptible power supply (UPS), and controlling a waveform of an AC voltage generated from the power source to signal a status of the power source may include signaling the status using an inverter of the UPS.

In some embodiments, the UPS may include a first UPS, signaling the status using an inverter of the UPS may comprise controlling an AC voltage on a first bus coupled to the first UPS. The methods may further include detecting the signaled status on the first bus and, responsive to the detected status, selectively coupling the first bus to a second bus configured to receive power from a second UPS. In further embodiments, the signaled status may be detected at a load and the load may be controlled responsive to the detected signaled status. For example, load may include a power distribution unit (PDU) and controlling the load responsive to the detected signaled status may include selectively de-energizing branch circuits coupled to the PDU. In further embodiments, the load may include a data processing device and controlling the load responsive to the detected signaled status may include altering a computing process executed by the data processing device.

Further embodiments provide methods including operating a power source to produce a voltage on a first bus, signaling a capacity of the power source by controlling a waveform of a voltage provided by the power source, providing power to a load from a UPS via a second bus and selectively coupling the first bus to the second bus based on the signaled capacity. The power source may include another UPS.

In some embodiments, providing power to a load from a UPS via a second bus may include providing power to a first load from a first UPS via the second bus, and the methods may further include providing power from a second UPS to a second load via a third bus and selectively coupling the first bus to the third bus based on the signaled capacity. Selectively coupling the first bus to the second bus based on the signaled capacity may include coupling the first bus to the second bus responsive to a failure of the first UPS and selectively coupling the first bus to the third bus based on the signaled capacity may include coupling the first bus to the third bus responsive to a failure of the second UPS if the signaled capacity is sufficient to serve the second load.

In some embodiments, the power source may include a third UPS. In some embodiments, the third UPS may be operated as a catcher UPS. In further embodiments, power may be provided from the third UPS to a third load via a fourth bus and operating the power source to produce the voltage on the first bus may include coupling the first bus to the fourth bus such that the third UPS generates the voltage on the first bus while providing power to the third load.

Still further embodiments may provide a system including a power source and a control circuit configured signal a status of the power source by controlling a waveform of an AC voltage generated from the power source. The power source may include a UPS, and the control circuit may be configured to operate an inverter of the UPS to signal the status. In some embodiments, the power source may include a generator and the control circuit may be configured to operate the generator to signal the status of the generator. The signaled status may include a capacity. The control circuit may be configured, for example, to set a frequency of the waveform of the AC voltage to signal the status of the power source.

Additional embodiments provide a system including a load configured to receive power from a power source and a control circuit operatively coupled to the load and configured to detect a status signal conveyed by a waveform of an AC voltage provided by the power source and to alter the load based on the detected status signal.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

The inventive subject matter may be embodied as apparatus, methods and computer program products. Some embodiments may be described with reference to block diagrams and/or operational illustrations that illustrate structures and operations. Blocks of the block diagrams and/or operational illustrations may generally implemented using electric circuits configured to perform the specified functions. These "circuits" may generally be implemented using analog and/or digital circuitry. The circuits may include discrete components and/or integrated components, such as data processing integrated circuits (e.g., microprocessors, microcontrollers, digital signal processors and the like) and application-specific integrated circuits (ASICs).

Each block in such diagrams may represent a module, segment, or portion of computer-executable program code for implementing the specified logical function(s). Computer-executable program code may be provided one or more data processors, special purpose processors, ASICs, and/or other programmable data processing apparatus, such that the instructions, which execute to the code to provide the functions/acts specified in the block diagrams and/or operational block or blocks.

These computer-executable program code may also be stored in a non-transitory medium that may direct a controller circuit to function in a particular manner, such that the program code stored in the non-transitory medium constitute an article of manufacture including instructions that implement the functions specified in the block or blocks of the block diagrams and/or operational illustrations. The non-transitory medium may be, but is not limited to, an electronic, magnetic, optical, electromagnetic, or semiconductor system, apparatus, or device. More specific examples (a non-exhaustive list) of the non-transitory medium include the following: hard disk devices, optical storage devices, magnetic storage devices, random access memory (RAM) devices, read-only memory (ROM) devices, erasable programmable read-only memory (EPROM or Flash memory) devices, and compact disc read-only memory (CD-ROM).

Some embodiments of the inventive subject matter arise from a realization that backup power systems may use capacity-constrained power sources, such as UPSs and generators. According to some embodiments, power system components may use voltage waveform signaling to communicate status information, such as capacity information, to other power system components. In some embodiments, for example, such signaling may be used to signal the capacity of a UPS to allow downstream system components to decide whether to connect a particular load to the UPS. Such signaling may, for example, use the frequency of the voltage generated by the UPS. Similar signaling may be performed by other system components, such as generators. In further embodiments, such signaling may also be used to inform intelligent loads, such as power distribution units (PDUs) and/or data processing devices, of the capacity or other status of a power source coupled thereto, so that such loads may, for example, take load shedding and/or data protection measures. According to further aspects, other voltage waveform characteristics, such as voltage amplitude, could be used in a similar manner to communicate status.

Data center power architectures that employ a reserve bus with back-up "catcher" UPS capacity have the potential to significantly improve reliability at a much lower cost compared to traditional architectures. Some studies indicate that such an architecture could double the reliability (Mean-Time-Between-Failures, MTBF) with a 35% reduced cost compared to a standard Tier II architecture. A main function of the catcher UPS is to provide back-up power in case of a primary UPS failure. It is envisioned, however, that the catcher UPS can be used to provide additional supporting power to more than one primary UPS to optimally distribute the power capacity of the catcher UPS across the data center. One potential issue with this approach is the possibility of overloading the catcher UPS. If the total load on a catcher UPS exceeds its capacity all loads supplied from the catcher UPS may fail. Some embodiments of the inventive subject matter may prevent overloading of a catcher UPS and a resulting loss of loads.

In a typical UPS, the load is coupled to the output of an inverter. An inverter may be viewed as is a variable power source that can adjust the frequency and magnitude of the voltage it produces. Output frequency regulation in an inverter may be based on a high precision digital clock, and the output frequency of such an inverter may be set to any of a variety of different values. UPSs also typically include phase lock loops (PLLs) that synchronize to the input line (utility) frequency and are traditionally used to synchronize the inverter frequency to the utility grid. According to some embodiments, a UPS may adjust its output voltage frequency according to a predetermined signaling code when operating, for example, in double-conversion or battery modes, based on the current load on the UPS and/or the remaining capacity of the battery or other energy source it uses. This frequency variation is practicable because UPSs typically are isolated from the utility grid when operating in such modes and critical loads, such as computers and telecommunications equipment, are often tolerant of such frequency variation. Other types of islanded power sources, such as inverters used with photovoltaic arrays or wind power sources, or diesel or natural gas fired generators, may be used in similar manner.

In a system using a catcher or other reserve UPS, a controller associated with a primary UPS served by a catcher UPS that detects such signaling may determine the present capacity of the catcher UPS prior to connecting its load to the catcher UPS. In this manner, it may be ensured that the catcher UPS has a desired capacity before connecting to the load to the catcher UPS. This form of communication may be faster than alternative techniques that use conventional communications links, such as TCP/IP over Ethernet, which may have latencies on the order of 200 milliseconds that may severely violate the disturbance tolerance of computing equipment (e.g., ITI/CBEMA standards, which is on the order of 10-20 milliseconds). In contrast, UPS inverter control and frequency estimation can be very fast (e.g., on the order of 1 millisecond). It is believed that, in the presence of a utility failure, a primary UPS could detect a primary utility failure event while nearly simultaneously determining the load of the catcher UPS and make a proper decision as to whether to engage the catcher UPS within several milliseconds. Therefore, even in the case when there are two nearly simultaneous primary UPS failures that are separated only by a matter of milliseconds, each primary UPSs may still obtain a correct estimate of the catcher UPS capacity before transferring its load to the catcher UPS.

Figure 1:
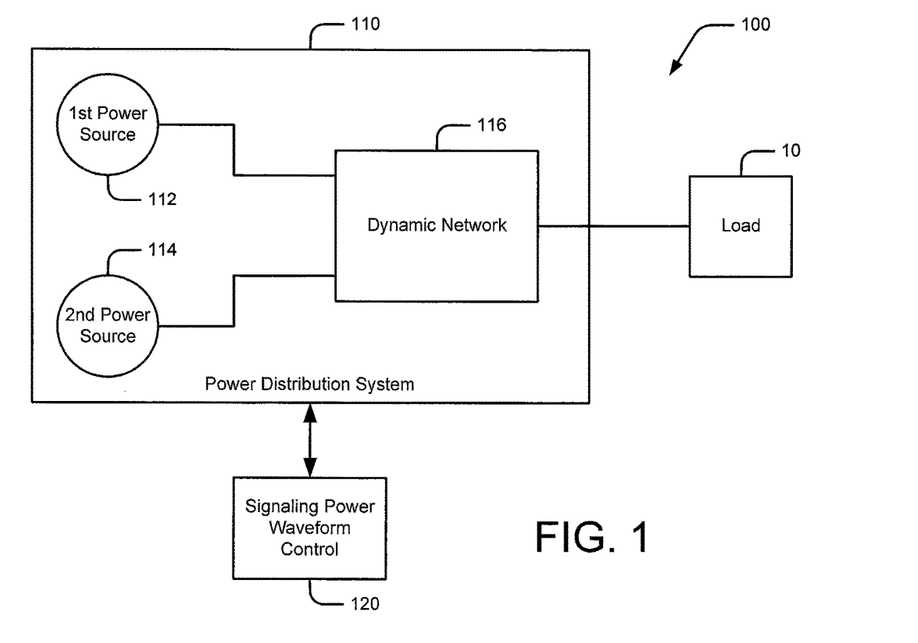
FIG. 1 is a schematic diagram illustrating a power system according to some embodiments.

FIG. 1 illustrates a system 100 according to some embodiments. The system 100 includes a power distribution system 110 configured to selectively couple at least two power sources, e.g. a first power source 112 and a second power source 114, to a load 10 via a dynamic network 116. It will be appreciated that the power sources 112, 114 may include any of variety of different sources, such as utility power sources, generators, and UPSs fed by batteries, photovoltaic (PV) arrays, wind-powered generators, fuel cells and the like. For example, in some embodiments, the first power source 112 may include a utility source and the second power source 114 may include UPS fed by a battery or other charge storage device (e.g., a capacitor bank), or a generator, such as a diesel or natural gas powered motor-generator set. The load 10 may include any of a number of different components, including, but not limited to data center equipment (server racks and associated cooling and other equipment), telecommunications equipment, medical equipment and the like, as well as power distribution components, such as power distribution units (PDUs), that serve such equipment. The dynamic network 116 may include any of a number of different types of components that are dynamically configurable to selectively route power from the power sources 112, 114 to the load 10. Such components may include, but are not limited to, switchgear, UPSs, conductors (e.g., cables, bus bars, bus ducts, etc.), power converters, transformers, and the like.

As further shown, the system 100 further includes a control circuit 120 configured to control the power distribution system 110 to provide power waveform signaling along the lines described above. For example, in exemplary embodiments described in detail below, such control circuitry may be used in or in conjunction with a UPS or generator to provide frequency-based capacity signaling that may be received, for example, by downstream components, such as other UPSs or loads (e.g., data processing devices or PDUs). These downstream devices may, for example, use the signaled capacity information to trigger load transfers, load shedding and other operations. It will be appreciated that embodiments of the inventive subject matter may be used in a variety of applications, such as in data centers, telecommunications systems, and the like.

It will be appreciated that embodiments of the inventive subject matter as illustrated in FIG. 1 may be implemented using any of a variety of different types of electrical circuits. Generally, these circuits may include analog circuits and/or digital circuits and may be implemented using discrete components and/or integrated circuits, such as microprocessors, microcontrollers, and application-specific integrated circuits (ASICs), such as mixed digital and analog circuits. Embodiments of the inventive subject matter may also include software components, e.g., application code and firmware configured to execute in data processing devices.

Figure 2:
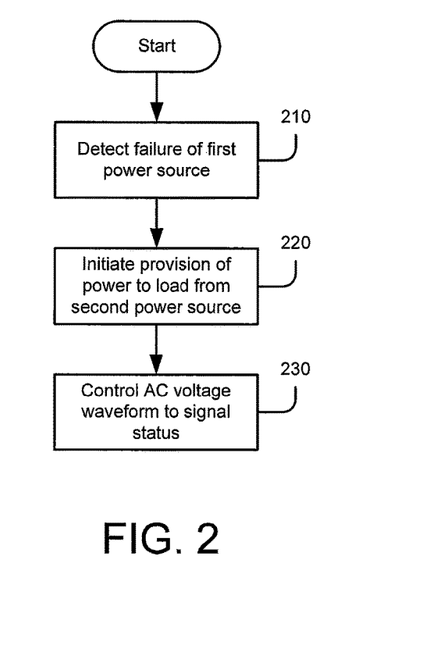
FIG. 2 is a flowchart illustrating operations of the power system of FIG. 1 according to some embodiments.

FIG. 2 is a flowchart providing an overview of operations of the system of FIG. 1 according to some embodiments. Upon detection of failure of the first power source 112 (block 210), the system 100 initiates provision of power to the load 10 from the second power source 114 (block 220). A waveform of an AC voltage produced from the second power source 114 is then controlled to signal a status of the second power source 114. The signaled status may include, for example, a capacity of the second power source 114. The signaled capacity may indicate, for example, an additional power capacity of the second power source 114 (e.g., a relative loading of the power source relative to a nominal rating) and/or a remaining energy capacity of the second power source 114. Remaining energy capacity may include, for example, a remaining capacity of an energy storage device, such as a battery or capacitor bank, associated with or included in the power source 114.

Figure 3:
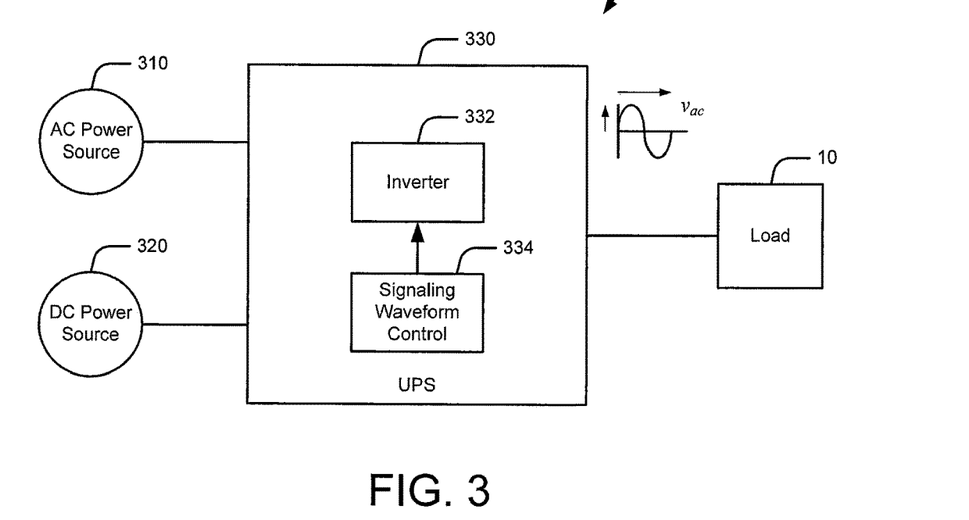
FIG. 3 is a schematic diagram illustrating an uninterruptible power supply (UPS) with waveform signaling capability according to some embodiments.
Figure 4:
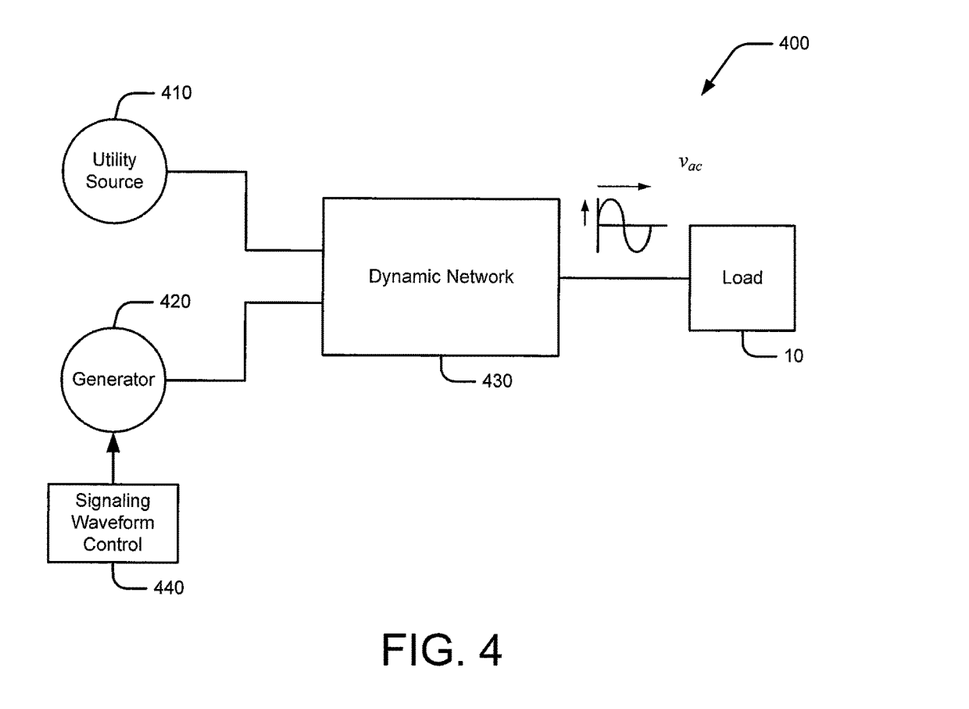
FIG. 4 is a schematic diagram illustrating a power system including a generator with waveform signaling capability according to some embodiments.

FIGS. 3 and 4 illustrate examples of how such power waveform signaling may be implemented in various power system components. Referring to FIG. 3, a power system 300 includes a UPS 330 configured to selectively provide power to a load 10 from an AC power source 310 and a DC power source (e.g., battery) 320. The UPS 330 includes an inverter 332 which is configured to generate an AC voltage that is applied to a load 10. The UPS 330 may include a control circuit 334 configured to control the inverter 332 and to provide voltage waveform signaling along the lines discussed above. The control circuit 334 may include, for example, a microcontroller configured to generate control signals for pulse width modulation of the inverter 332, and the signaling capability may be implemented using software executing on such a microcontroller to perform the inverter control operations. The voltage waveform produced by the inverter 332 may be used to indicate, for example, an available power capacity of the inverter and/or an available energy capacity of the DC source 320.

Referring to FIG. 4, according to some embodiments, a power system 400 may include a utility source 410, a generator 420 and a dynamic network 430 configured to selectively route power from the utility source 410 and the generator 420 to a load 10. The dynamic network may include, for example, switchgear, conductors, converters, and other power system components that may be controlled to provide selective power routing. The system 400 may include a control circuit 440 that is configured to control the generator 420 to provide waveform signaling along lines described above, e.g., by controlling frequency of an AC voltage generated by the generator 420 using a generator speed control loop. Such signaling may be used for example, to signal an available power capacity of the generator 420 to components in the dynamic network 430 and/or to the load 10.

Figure 5:
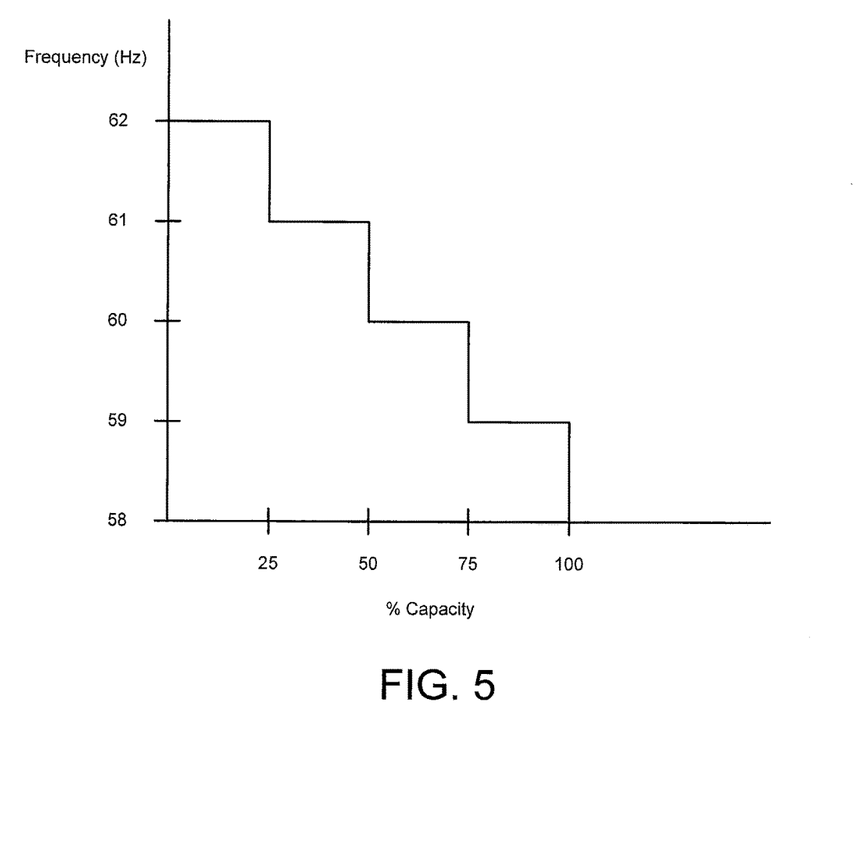
FIG. 5 is a graph illustrating an example of a voltage waveform signaling scheme according to some embodiments.

FIG. 5 illustrates an example of a signaling scheme that may be used in some embodiments. In particular, respective levels of a frequency of a voltage produced by a UPS, generator, or the like may be used to provide an indication of relative capacity, here shown as a percentage of a reference capacity. The percentage could represent, for example, an available power capacity relative to a nominal capacity and/or an available energy capacity relative to a reference level of energy. It will be appreciated, however, that different signaling schemes may be used, such as schemes that use a continuous or higher resolution relationship between frequency and capacity. Some embodiments may use voltage amplitude for signaling in a similar manner, and such amplitude signaling may be used in combination with frequency signaling. It will be further appreciated that some embodiments may communicate status other than capacity in a similar manner. For example, such waveform signal may be used to signal some other measure of the potential availability and/or reliability of a particular power source, which may be used by downstream devices to guide various network and load reconfiguration operations.

Figure 6:
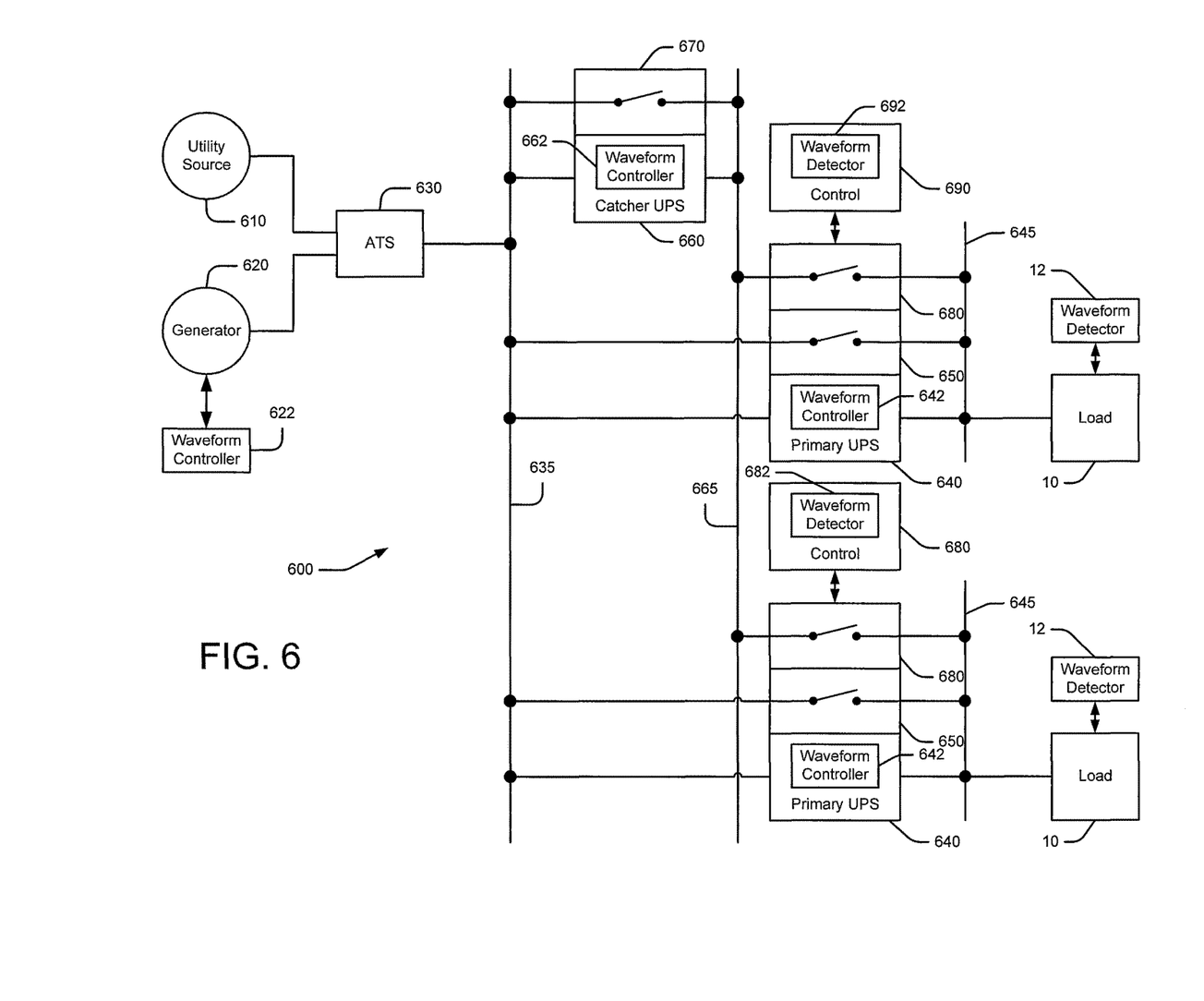
FIG. 6 is a schematic diagram illustrating a power system with a redundant catcher UPS arrangement according to some embodiments.

As discussed above, embodiments of the inventive subject matter may find utility in a number of different power distribution applications, including various data center applications. FIG. 6 illustrates a system 600 which may be used in a data center application and which uses waveform signaling along the lines discussed above. The system 600 includes an automatic transfer switch (ATS) 630, which is configured to selectively couple a utility source 610 and a motor-generator set 620 to an input bus 635. First and second primary UPSs 640 are coupled to the input bus 635 and provide power to respective buses 645 that serve protected loads 10. The protected loads 10 may include, for example, respective sets of equipment (e.g., data halls) including server racks and associated equipment, such as power distribution and cooling equipment. Respective static switches 650 provide direct coupling from the input bus 635 to the protected load buses 645 to allow bypassing of the primary UPSs 640. Respective static switches 680 are configured to couple respective ones of the critical buses 645 to a reserve bus 665 that is powered by a catcher UPS 670. An additional static switch 670 provides a capability to bypass the catcher UPS 670.

The system 600 can provide isolated redundancy. In particular, the catcher UPS 660 may energize the reserve bus 665 while disconnected from the protected load buses 645, which are served by the primary UPSs 640. When either of the primary UPSs 640 fails (e.g., experiences a hardware failure and/or has insufficient battery capacity), the associated static switch 680 may be closed to allow the catcher UPS 660 to quickly assume the load previously served by the failed primary UPS 640.

As further shown, a control circuit 662 of the catcher UPS 660 may provide a waveform controller 662 configured to control a waveform (e.g., a frequency) of a voltage produced by an inverter of the catcher UPS 660 on the reserve bus 665 to signal an available capacity of the catcher UPS 660. The waveform controller 662 may be implemented, for example, in a control circuit of the catcher UPS 660 that operates the inverter. The waveform signaling may indicate, for example, an available power capacity of the catcher UPS 660 and/or an available energy capacity of a battery or other energy storage device used by the catcher UPS 660. Control circuits 690 associated with respective ones of the primary UPSs 640 may include waveform detector circuitry 692 configured to detect this signaling and may determine whether the catcher UPS 660 has adequate capacity to serve the associated loads 10. It will be appreciated that this signaling may be provided, for example, when the catcher UPS 660 is operating on battery or off power provided by the utility source 610 or generator 620.

Thus, for example, if a first one of the primary UPSs 640 has failed and has its load picked up by the catcher UPS 660, the control circuit 690 associated with the second primary UPS 640 may determine whether the catcher UPS 660 has adequate remaining capacity to serve its associated load 10 in the event of failure. For example, if the load 10 already coupled to the catcher UPS 660 is relatively small, there may be ample remaining capacity to also take on the load 10 of the second primary UPS 640 if it fails. The second primary UPS 640 may also determine that the catcher UPS 660 has adequate remaining capacity to support a paralleled arrangement with the second primary UPS 640, such that the two UPSs may jointly serve the critical load 10. The signal capability enables the system 600 to provide greater availability and more efficiently use available resources.

As further illustrated in FIG. 6, other components of the system 600 may also utilize voltage waveform signaling. For example, the primary UPSs 640 may provide UPS signaling that may be detected by waveform detectors 12 associated with the protected loads 10. When a primary UPS 640 is operating on-line or on battery and its associated protected load 10 is isolated from the rest of the system 600, a waveform controller 642 of the primary UPS 640 may vary its output voltage frequency to indicate its remaining battery capacity to the waveform detector 12 associated with the load 10. In further embodiments, a more comprehensive capacity signaling may be provided. For example, the primary UPS 640 may signal an indication of its own remaining power and/or energy capacity and the capacity of the catcher UPS 660 that backs it up. When the system 600 is operating on generator power, the primary UPSs 640 may also convey generator capacity information to the waveform detectors 12 of the protected loads 10 using voltage waveform signaling. For example, the primary UPSs 640 may simply pass through waveform signaling controlled by a waveform controller 622 associated with the generator 620. In some embodiments, such signaling may pass through the bypass switches 650 if the primary UPSs 640 are on bypass or may be relayed using the local waveform detectors 682 and waveform controllers 642 if the primary UPSs 640 are running in a double conversion mode that isolates the generator 620 from the loads 10. In this manner, capacity information may be quickly communicated without using relatively high latency communications links.

It will be appreciated that the UPSs 640, 660 shown in FIG. 6 may have any of a variety of different configurations, including, but not limited to, double-conversion and "rectifierless" (e.g., standby) configurations. The UPSs 640, 660 may generally have any of a variety of different ratings, e.g., the catcher UPS 660 may be higher capacity than the primary UPSs 640. The UPSs 640, 660 may operate off any of a number of different types of auxiliary power sources, including, but not limited to batteries, fuel cells and capacitors, and these sources may have the same or different capacities and power delivery capabilities.

Figure 7:
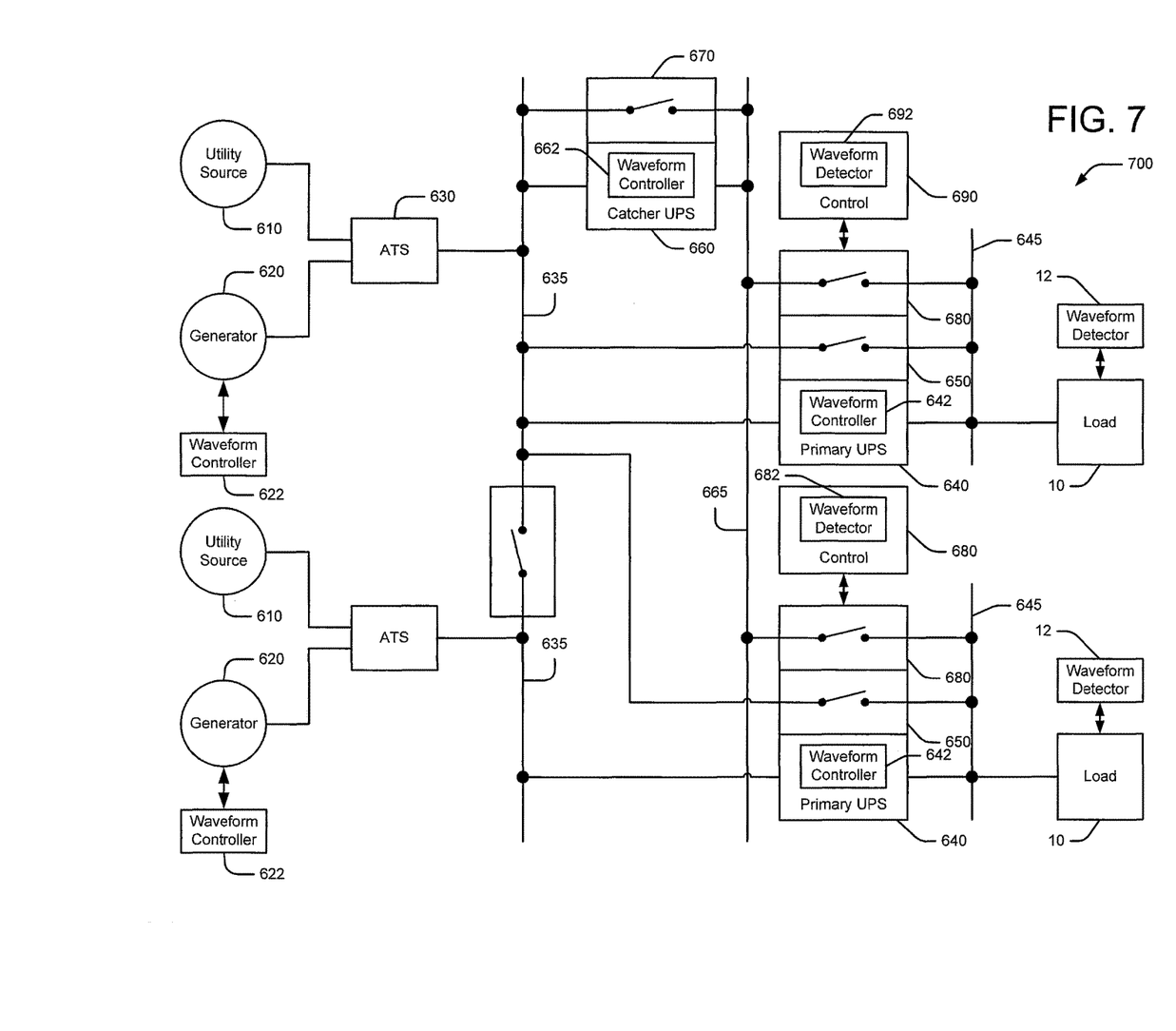
FIG. 7 is a schematic diagram illustrating a power system with a redundant catcher UPS and dual input bus arrangement according to further embodiments.

It will be appreciated that the inventive subject matter may be applied in any of a wide variety of power systems other than the system illustrated in FIG. 6. For example, FIG. 7 illustrates a system 700 illustrates a modification of the system of FIG. 6, including an additional utility source 610, an additional generator 620, and an additional transfer switch 630 that feed an additional input bus 635.

Figure 8:
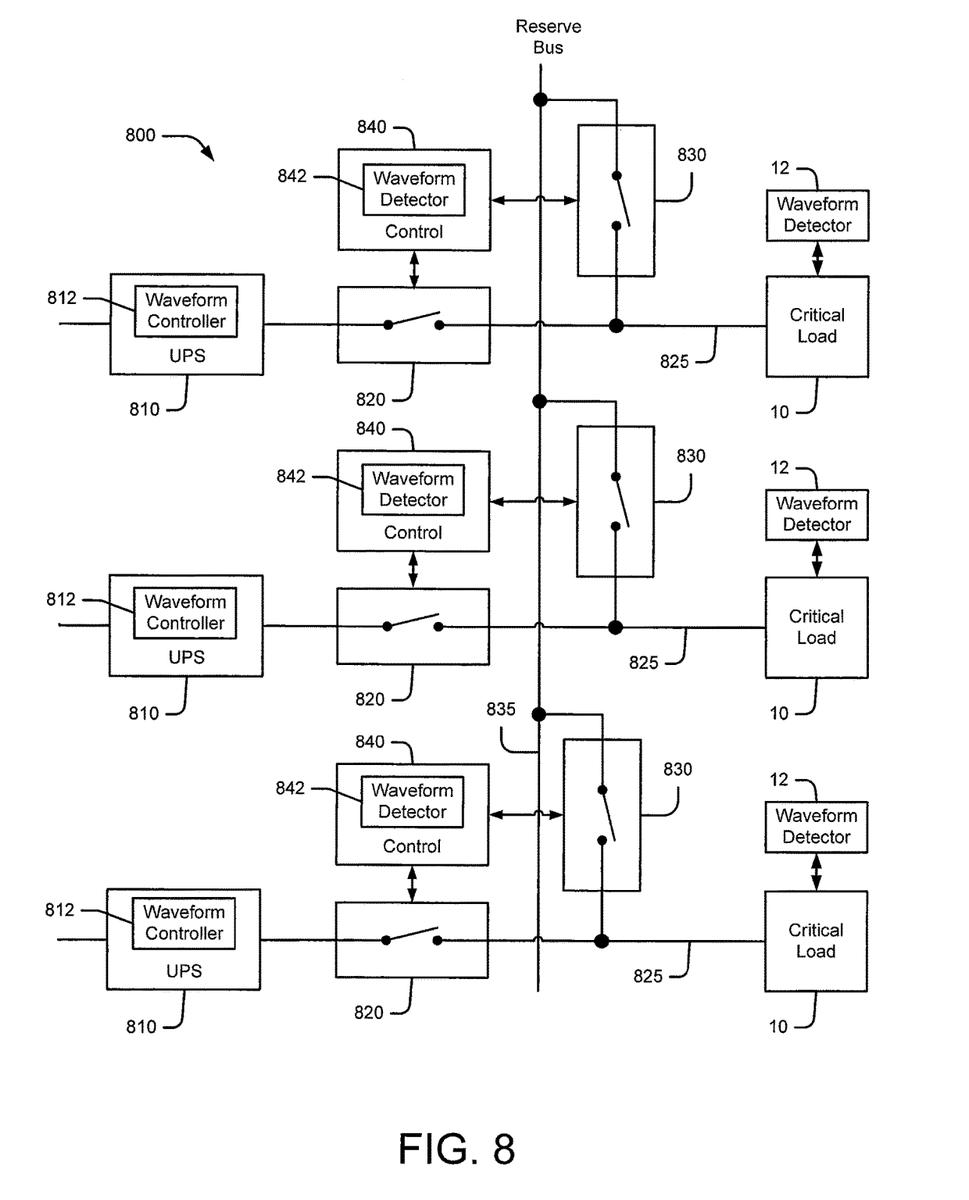
FIG. 8 is a schematic diagram illustrating a power system with a UPS reserve bus arrangement according to some embodiments.

FIG. 8 illustrates a redundant system 800 having a UPS configuration along the lines described in the aforementioned U.S. Pat. No. 8,850,237 et al., the disclosure of which is incorporated herein by reference in its entirety. The system 800 includes multiple UPSs 810 which may be connected to respective load buses 825 that serve protected loads 10 by respective switches 820 and to a reserve bus 835 by respective switches 830. This arrangement enables any one (or more) of the UPSs 810 to be designated as a reserve UPS that serves the reserve bus 835, and operates to back up the other UPSs 810 in the event of failure. In a manner similar to that described above, the UPSs 810 may include waveform controllers 810 that use voltage waveform signal to convey status information, such as capacity. Switch control circuits 840 provide waveform detectors 842 that control the switches 820, 830 to control, for example, how many of the protected loads 10 may be connected to any one or more of the UPSs 810 that are operating as a reserve UPS. Voltage waveform signaling may also provide information to waveform detectors 12 associated with the protected loads 10. The UPSs 810 may also support conveyance of information from upstream devices, such as generators, in a manner similar to that described above with reference to FIG. 6.

Figure 9:
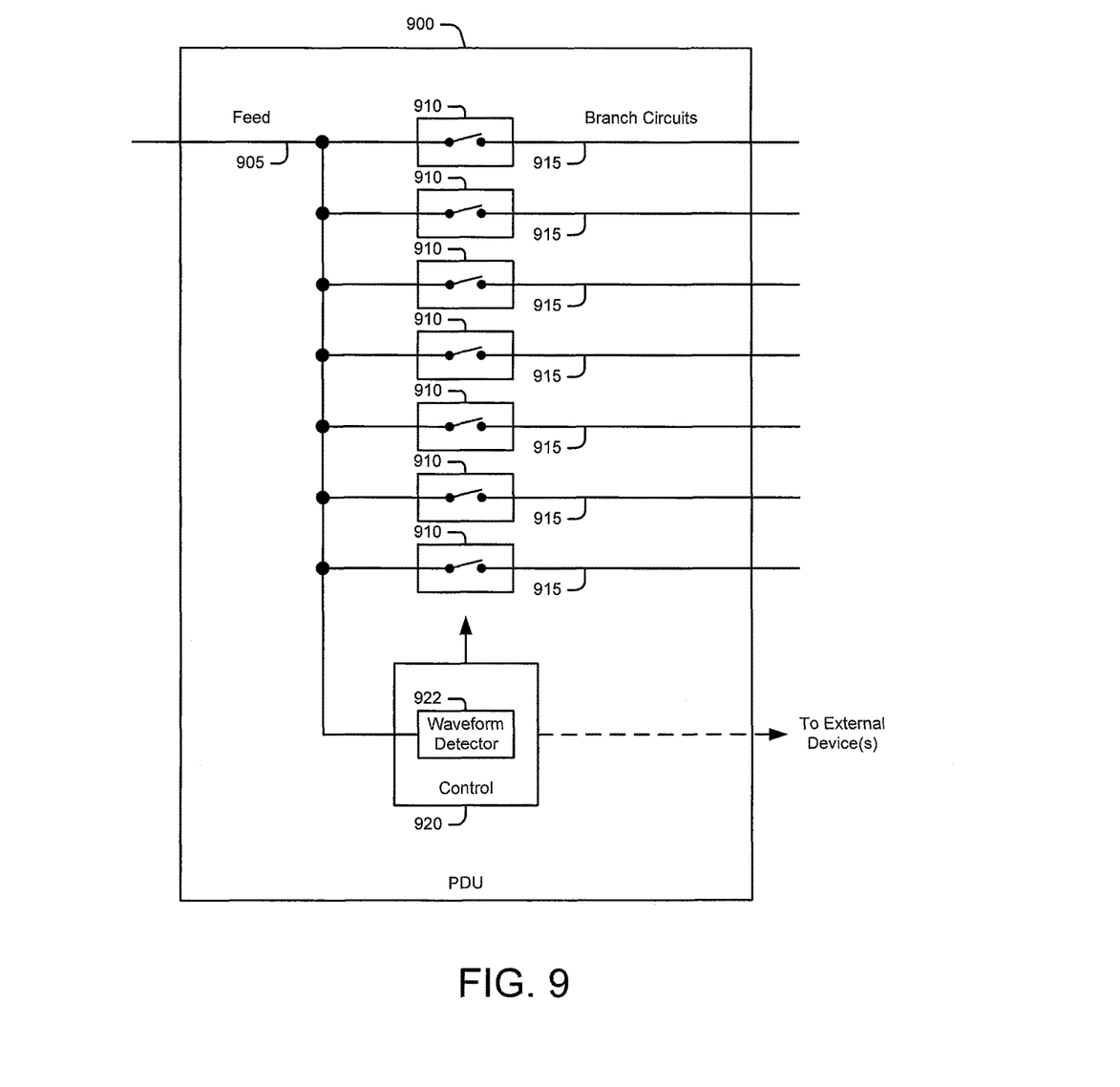
FIG. 9 is a schematic diagram illustrating a power distribution unit (PDU) with a voltage waveform detection capability according to some embodiments.

As indicated above, voltage waveform signaling may be used to communicate information to intermediate load components, such as PDUs, which may perform operations based on the information conveyed. FIG. 9 illustrates a PDU 900 which may include such functionality. In a data center application, the PDU 900 may comprise, for example, a PDU cabinet that serves multiple equipment racks and/or associated equipment or an in-rack PDU device, such as smart power strip (e.g., an ePDU). The PDU includes a plurality of switches 910, respective ones of which connect an input feeder 900 to respective branch circuits 915. The switches 910 may be controlled by a control circuit 920 including a waveform detector 922 configured to detect waveform signaling by an upstream device such as a UPS or generator. The control circuit 920 may selectively open the branch circuit switches 910 responsive to detected signaling to, for example, selectively shed less critical loads, such as peripheral equipment, based on capacity information received via the voltage waveform signaling.

Figure 10:
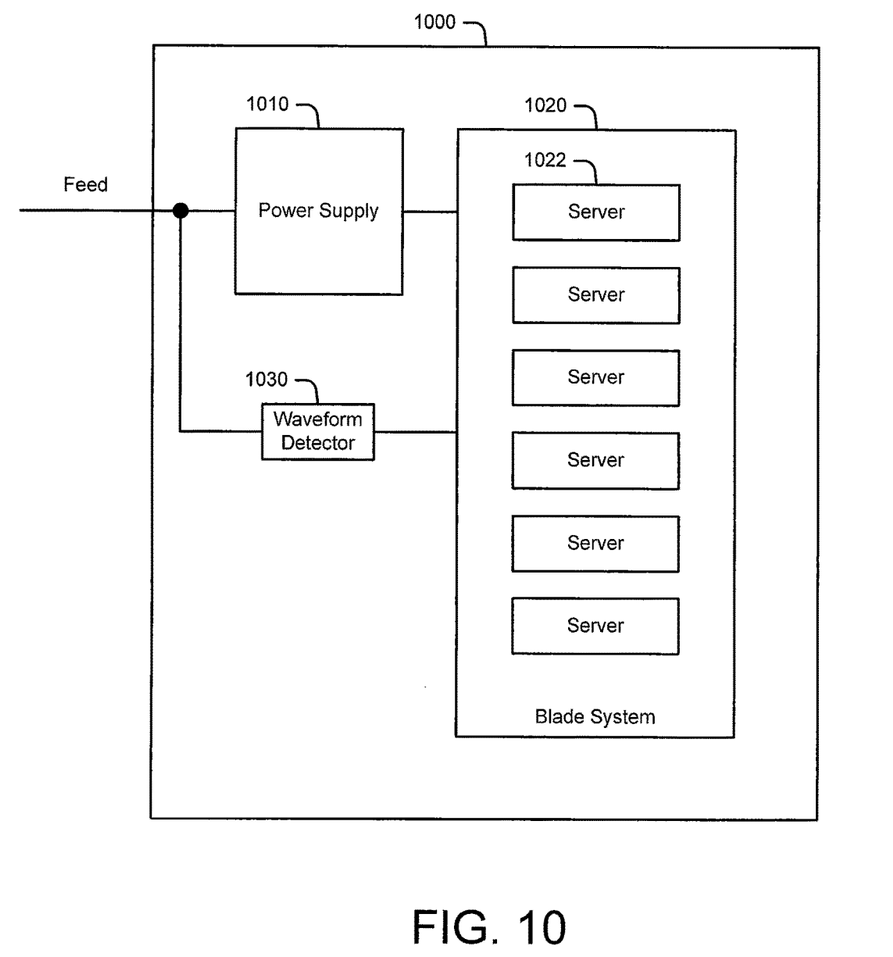
FIG. 10 is a schematic diagram illustrating a computer apparatus with a voltage waveform detection capability according to some embodiments.

Voltage waveform signaling may also be used by terminal loads, such as computing equipment. FIG. 10 illustrates a server rack 1000 including a power supply 1010 that receives AC power from power distribution equipment along the lines described above with reference to FIGS. 6-9 and provides DC power to blade servers 1022 of a server blade system 1020. The rack 1000 may be provided with a waveform detector circuit 1030 configured to detect voltage waveform signaling from upstream power system components, such as UPSs and generators, and may convey such information to the blade server system 1020. In response to this information, the blade server system 1020 may, for example, terminate, transfer or otherwise alter computing processes running on the blade servers 1022 to reduce loading.

Figure 11:
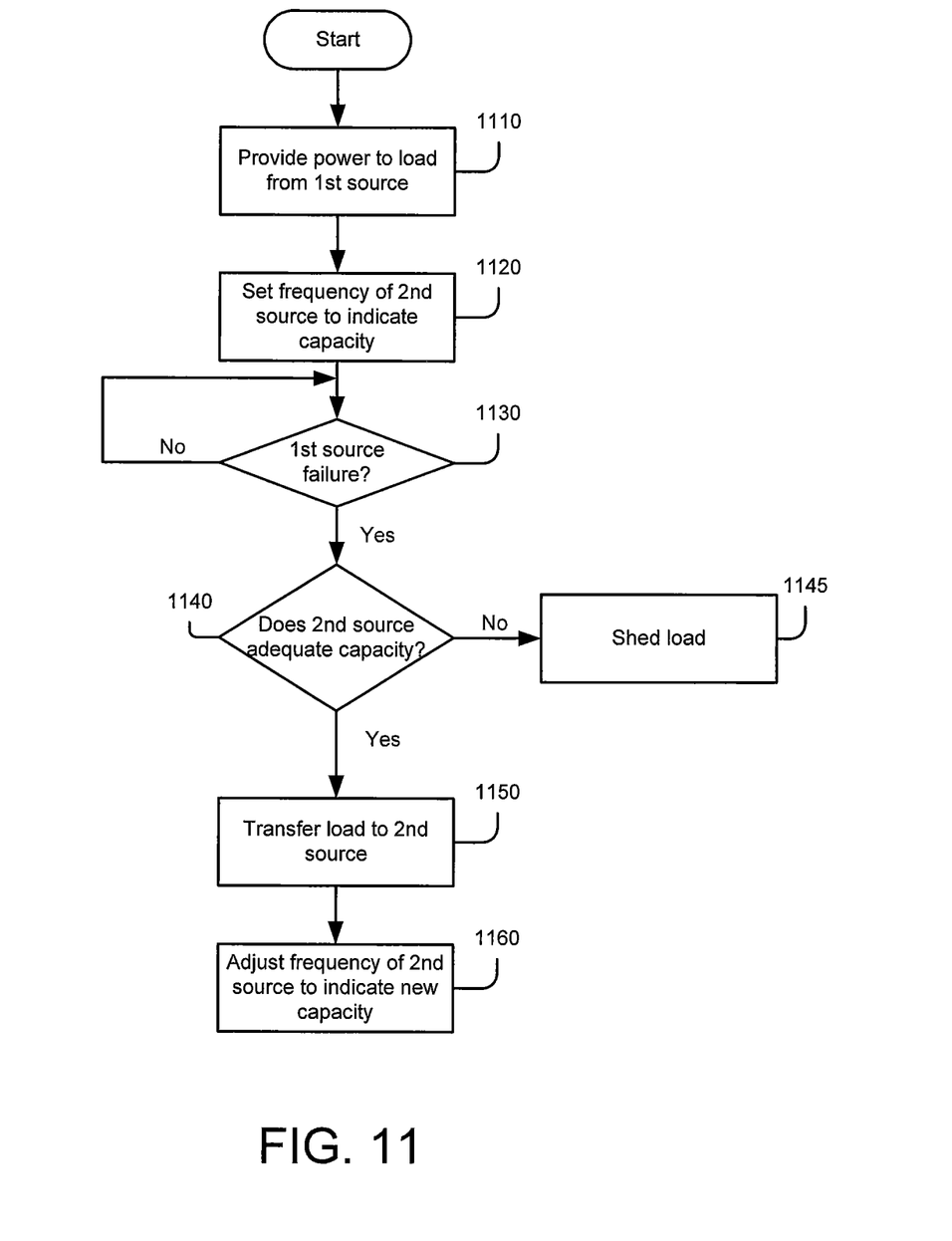
FIG. 11 is a flowchart illustrating power system operations according to further embodiments.

FIG. 11 illustrates operations that may be performed by a power system, such as the systems illustrated in FIGS. 6-8. Power is provided to a load from a first source (block 1110P. The first source may include, for example, a primary UPS in a "catcher" system such as the primary UPSs 640 illustrated in FIG. 6 or FIG. 7, or a UPS in distributed redundant system, such as one of the UPSs 810 illustrated in FIG. 8. A frequency of a second source is set to indicate a capacity of the second source (block 1120). The second source may include, for example, a catcher UPS, such as catcher UPSs 660 illustrated in FIG. 6 or FIG. 7, or another UPS in a distributed redundant system, such as a second one of the UPSs 810 that is connected to the reserve bus 835 shown in FIG. 8. If a failure of the first source is detected and the frequency of the second source indicates that the second source has adequate power and/or energy capacity to serve the load of the first source, the load may be transferred to the second source (blocks 1130, 1140, 1150). Adequacy of capacity may constitute, for example, sufficient capacity to serve the combined load with a margin that accounts for expected fluctuations of the load. The frequency of the second source may then be adjusted to reflect the change in its capacity due the added load (block 1150). If the second source is inadequate to take on the load served by the first source, the load may be shed (block 1145).

The operations illustrated in FIG. 11 is also applicable to power transfers involving UPSs and generators. For example, referring to FIG. 11, power may be provided to a load from a first source in the form of a UPS, such as one of the primary UPSs 640 or the catcher UPSs 660 shown in FIG. 6 or FIG. 7 (block 1110). A frequency of a voltage produced by a generator, such as the generators 620 of FIG. 6 or FIG. 7, is set to indicate the generator's capacity (block 1120). If the UPS is failing, e.g., its battery is depleted and the generator has adequate capacity to serve the UPS's load, the load may be transferred to the generator (blocks 1130,

1140, 1150). If the generator has inadequate capacity, the load may be shed (block 1145).

It will be further appreciated that the operations illustrated in FIG. 11 are also applicable to systems using other combinations of power sources. For example, in some microgrid applications, the first power source may be an inverter coupled to a wind or solar power source and the second power source may another such inverter or a diesel or natural gas powered generator.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A method comprising:
    providing power from a power source comprising an electromechanical generator or an inverter to an AC electrical power distribution network that includes at least one bus and a plurality of devices that selectively couple respective different loads to the at least one bus to receive power from the power source; and
    the generator or the inverter signaling a capacity of the power source over the AC electrical power distribution network by controlling the generator or the inverter to set a frequency of an AC voltage produced on the at least one bus by the generator or the inverter at respective frequency levels corresponding to respective capacity levels; and
    a device of the plurality of devices detecting the set frequency from the at least one bus and responsively connecting one of the loads to the at least one bus based on the capacity signaled by the detected frequency.

2. The method of claim 1, wherein the signaled capacity comprises a power or energy capacity and wherein the respective capacity levels comprise respective power levels or energy levels.

3. The method of claim 1, wherein the power source comprises an uninterruptible power supply (UPS) and wherein signaling a capacity of the power source over the AC electrical power distribution network by controlling the generator or the inverter to set a frequency of an AC voltage produced on the at least one bus by the generator or the inverter at respective frequency levels corresponding to respective capacity levels comprises controlling an inverter of the UPS to signal the capacity.

4. The method of claim 3, wherein signaling a capacity of the power source over the AC electrical power distribution network by controlling the generator or the inverter to set a frequency of an AC voltage produced on the at least one bus by the generator or the inverter at respective frequency levels corresponding to respective capacity levels comprises signaling a capacity of a first UPS by controlling generation of a waveform of an AC voltage on a first AC bus of the AC electrical power distribution network by the first UPS, and wherein the method further comprises:
    detecting the signaled capacity on the first AC bus; and
    wherein at least one device of the plurality of devices detecting the set frequency from the at least one bus and responsively connecting one of the loads to the at least one bus based on the capacity signaled by the detected frequency comprises closing a switch to directly connect the first AC bus to a second AC bus of the AC electrical power distribution network that previously received power from a second UPS.

5. The method of claim 4, wherein closing the switch to directly connect the first AC bus to the second AC bus occurs responsive to a failure of the second UPS.

6. The method of claim 4, wherein closing the switch to directly connect the first AC bus to the second AC bus is followed by operating the first UPS and the second UPS in parallel to jointly support a load.

7. A system comprising:
    an AC electrical power distribution network that includes at least one bus and a plurality of devices that selectively couple respective different loads to the at least one bus;
    a power source comprising an electromechanical generator or an inverter coupled to an AC electrical power distribution network; and
    a control circuit configured to cause the generator or the inverter to signal a capacity of the power source over the AC electrical power distribution network by controlling the generator or the inverter to set a frequency of an AC voltage produced on the at least one bus by the generator or the inverter at respective frequency levels corresponding to respective capacity levels,
    wherein each of the plurality of devices is configured to detect the set frequency from the at least one bus and to responsively connect the loads to the at least one bus based on the capacity signaled by the detected frequency.

8. The system of claim 7, wherein the power source comprises a UPS and wherein the control circuit is configured to operate an inverter of the UPS to signal the capacity.

9. The system of claim 7, wherein the power source comprises a generator and wherein the control circuit is configured to operate the generator to signal the capacity.

10. The system of claim 7, wherein the signaled capacity comprises a power or energy capacity and wherein the respective capacity levels comprise respective power levels or energy levels.

\* \* \* \* \*